United States Patent
Matuchniak et al.

(10) Patent No.: US 9,332,287 B2
(45) Date of Patent: *May 3, 2016

(54) SYSTEM AND METHOD FOR SESSION MANAGEMENT OF STREAMING MEDIA

(71) Applicant: THOMSON LICENSING, Issy de Moulineaux (FR)

(72) Inventors: Peter Tadeusz Matuchniak, Irvine, CA (US); Bryan Bledstein, Irvine, CA (US); Lance Ware, Huntington Beach, CA (US)

(73) Assignee: Thomson Licensing, Issy les Moulineaux (FR)

(*) Notice: Subject to any disclaimer, the term of this patent is extended or adjusted under 35 U.S.C. 154(b) by 0 days.

This patent is subject to a terminal disclaimer.

(21) Appl. No.: 14/580,615

(22) Filed: Dec. 23, 2014

(65) Prior Publication Data

US 2015/0128165 A1    May 7, 2015

Related U.S. Application Data

(63) Continuation of application No. 12/742,974, filed as application No. PCT/US2008/012685 on May 14, 2010, now Pat. No. 8,924,998.

(60) Provisional application No. 61/003,334, filed on Nov. 16, 2007.

(51) Int. Cl.
*H04N 7/16* (2011.01)
*H04N 21/239* (2011.01)
(Continued)

(52) U.S. Cl.
CPC ........ *H04N 21/2393* (2013.01); *H04L 65/1069* (2013.01); *H04L 65/1083* (2013.01);
(Continued)

(58) Field of Classification Search
CPC .............. H04N 21/2393; H04N 21/24; H04N 21/2541; H04N 21/25891; H04N 21/47202
See application file for complete search history.

(56) References Cited

U.S. PATENT DOCUMENTS

| 6,166,730 | A  | * | 12/2000 | Goode | ............... | H04N 7/17336 |
| | | | | | | 348/E7.073 |
| 7,035,899 | B2 | * | 4/2006 | Marchon | ........... | H04L 29/06027 |
| | | | | | | 348/E7.083 |

(Continued)

FOREIGN PATENT DOCUMENTS

| CN | 101035256 | 9/2007 |
| EP | 1788773   | 5/2007 |

(Continued)

OTHER PUBLICATIONS

Unknown: "How can I restrict one stream per user?", Jan. 31, 2007, XP002678013, Retrieved from the Internet: URL:http://forums.adobe.com/thread/178761[retrieved on Jun. 19, 2012] * the whole document *.

(Continued)

*Primary Examiner* — Olugbenga Idowu
(74) *Attorney, Agent, or Firm* — Robert D. Shedd; Vincent E. Duffy; Michael A. Pugel

(57) ABSTRACT

A system and method for session management of streaming media are provided. The system and method authenticate and validate any request for live or streaming video and manage the streaming session in a manner that continues to verify the validity of existing video streams with respect to new requests. The system and method provide for receiving a first request for a first video stream from a client, generating a token based on the first request and at least one parameter associated with the client, validating the token based on at least one predetermined rule associated with the client, and upon validation, providing the first video stream to the client. Upon receiving a subsequent second request for a second video stream, the system and method validate a second token based on the first video stream, terminate the first video stream and provide the second video stream to the client.

20 Claims, 5 Drawing Sheets

(51) Int. Cl.

| | | |
|---|---|---|
| *H04N 7/173* | (2011.01) | |
| *H04N 21/24* | (2011.01) | |
| *H04N 21/254* | (2011.01) | |
| *H04N 21/258* | (2011.01) | |
| *H04N 21/472* | (2011.01) | |
| *H04N 21/61* | (2011.01) | |
| *H04L 29/06* | (2006.01) | |

(52) U.S. Cl.
 CPC ........ *H04L65/1089* (2013.01); *H04L 65/4084* (2013.01); *H04N 7/162* (2013.01); *H04N 7/17318* (2013.01); *H04N 21/24* (2013.01); *H04N 21/2541* (2013.01); *H04N 21/25816* (2013.01); *H04N 21/25891* (2013.01); *H04N 21/47202* (2013.01); *H04N 21/6125* (2013.01)

(56) References Cited

U.S. PATENT DOCUMENTS

| | | | |
|---|---|---|---|
| 2003/0005118 A1* | 1/2003 | Williams | ................ H04L 63/08 709/225 |
| 2003/0061305 A1 | 3/2003 | Copley et al. | |
| 2004/0024688 A1 | 2/2004 | Bi et al. | |
| 2004/0054678 A1 | 3/2004 | Okamoto et al. | |
| 2004/0059913 A1 | 3/2004 | De Jong | |
| 2004/0098595 A1 | 5/2004 | Aupperle et al. | |
| 2005/0278259 A1 | 12/2005 | Gunaseelan et al. | |
| 2007/0024705 A1* | 2/2007 | Richter | .............. H04N 7/17318 348/142 |
| 2009/0150949 A1* | 6/2009 | Keum | ................... H04N 7/165 725/109 |

FOREIGN PATENT DOCUMENTS

| | | |
|---|---|---|
| JP | 2003070042 | 3/2003 |
| JP | 2006004237 | 6/2004 |
| JP | 2004521414 | 7/2004 |
| JP | 2004310562 | 11/2004 |
| JP | 2007519303 | 5/2005 |
| JP | 20074432 A | 1/2007 |
| JP | 2007150764 | 6/2007 |
| JP | 2007156508 | 6/2007 |
| JP | 2007528680 | 10/2007 |
| WO | WO03007571 | 1/2003 |
| WO | WO2005048029 | 5/2005 |
| WO | WO2005086865 | 9/2005 |

OTHER PUBLICATIONS

Anonymous: Prevent multiple people using one account; Sep. 6, 2006, XP055168426, Retrieved from the Internet:URL:http://board.phpbuilder.com/showthread.php?1 0324525-Preventmultiple-people-using-one-account, [retrieved on Feb. 9, 2015].

* cited by examiner

SYSTEM AND METHOD FOR SESSION MANAGEMENT OF STREAMING MEDIA

RELATED APPLICATIONS

This application is a continuation of applicant's co-pending United States application Ser. No. 12/742,974, filed May 14, 2010, which claims the benefit under U.S.C. §365 of International Application No. PCT/US2008/012685, filed Nov. 12, 2008, which claims the benefit under 35 U.S.C. §119 of U.S. provisional application 61/003,334 which was filed in the United States on Nov. 16, 2007.

TECHNICAL FIELD OF THE INVENTION

The present disclosure generally relates to computer graphics processing and display systems, and more particularly, to a system and method for session management of streaming media, e.g., audio or video.

BACKGROUND OF THE INVENTION

An increasingly popular type of technology for providing information to clients over a network is known as "streaming media." In general, streaming media presents data (e.g., typically audio and/or video) to a client in a streaming or continuous fashion. That is, with streaming media a client is not required to receive all of the information to be presented before the presentation begins. Rather, presentation of information in a streaming media file may begin before the entire file is received by the client, and as the received portion of the file is being presented, further portions of the file continue to be received by the client for later presentation.

Streaming media is a particularly popular technique for communicating audio and/or video files from a server to a client. Audio and video files tend to be quite large, even after being compressed. If streaming media is not used, an entire file is generally required to be downloaded to a client before the client can begin to play the file. Such a download may require an undesirably long delay before the client can begin playing the file. With streaming media (e.g., streaming audio or streaming video), a client is not required to wait until the entire file is downloaded to play it. Instead, the client can begin playing the file (e.g., presenting the video and/or audio to a user) while it downloads to the client.

Streaming media may be used for any of a number of purposes, including entertainment, distance learning and corporate purposes. Entertainment companies stream movies, music, and sporting events, distance learning companies stream educational content, and corporations stream training materials, presentations and commercials. Furthermore, a media stream can be on demand or live. On demand streams are stored on a server for a long period of time, and are available to be transmitted at a user's request. Live streams are only available at one particular time, for example, as in a video stream of a live sporting event.

Referring to FIG. 1, a conventional system 100 for streaming media is illustrated. Generally, a live video source 102 is broadcasted via a broadcast center. The video source or feed is input as raw video to encoding servers 104, which encode the video. The encoding servers 104 encrypt and compress the raw video feed, so that it is protected with DRM (digital rights management) and also is lighter in size on the network. Acquisition servers 106 then acquire the encoded video for distribution. The encoded video is then passed onto streaming media servers 108 for streaming the video to at least one user 110. A user 110 may initiate the streaming of video by logging into or making a request at portal 112. The portal 112 then forwards the user's request to the streaming media server 108 which then streams the live video to the user 110. The user 110 will then watch the video with an appropriate media player. In addition, the user 100 may request a streaming news feed 116 from a second source to be viewed at, for example, a client computer.

However, a need exists for techniques for controlling the streaming media when a particular user requests several streams concurrently.

SUMMARY

A system and method for session management of streaming media, e.g., audio or video, are provided. The system and method of the present disclosure authenticate and validate any request for live or streaming video and manage the streaming session in a manner that continues to verify the validity of existing video streams with respect to new requests. In addition, every single channel change or new video request is recorded so that all activity is available at the most granular level.

According to one aspect of the present disclosure, a method for providing a video stream is provided. The method includes the steps of receiving a first request for a first video stream from a client, generating a token based on the first request and at least one parameter associated with the client, validating the token based on at least one predetermined rule associated with the client, and upon validation, providing the first video stream to the client.

In another aspect, the method further includes receiving a subsequent second request for a second video stream, generating a second token based on the second request and at least one parameter associated with the client, validating the second token based on the provided first video stream, and, wherein if the second token is not validated, terminating the first video stream and providing the second video stream to the client.

In a further aspect, the at one parameter of the token includes at least one of an external transaction ID, a user ID, an IP address, a channel number, video quality level, program information, request date and request time.

In another aspect, the generating step of the method includes returning the token in a URL link to the client and the validating step includes receiving the token upon invoking the URL by the client.

In yet a further aspect, the providing step of the method includes generating a playlist to control the videos stream to be sent to the client. The playlist provides the requested first video stream or an error video terminating the requested first video stream.

According to another aspect of the present disclosure, a system for providing a video stream includes a portal element for receiving a first request for a first video stream from a client, the portal element for generating a token based on the first request and at least one parameter associated with the client, a sessions element for validating the token based on at least one predetermined rule associated with the client, and upon validation, a streaming element for providing the first video stream to the client.

BRIEF DESCRIPTION OF THE DRAWINGS

These and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

Figure 1:
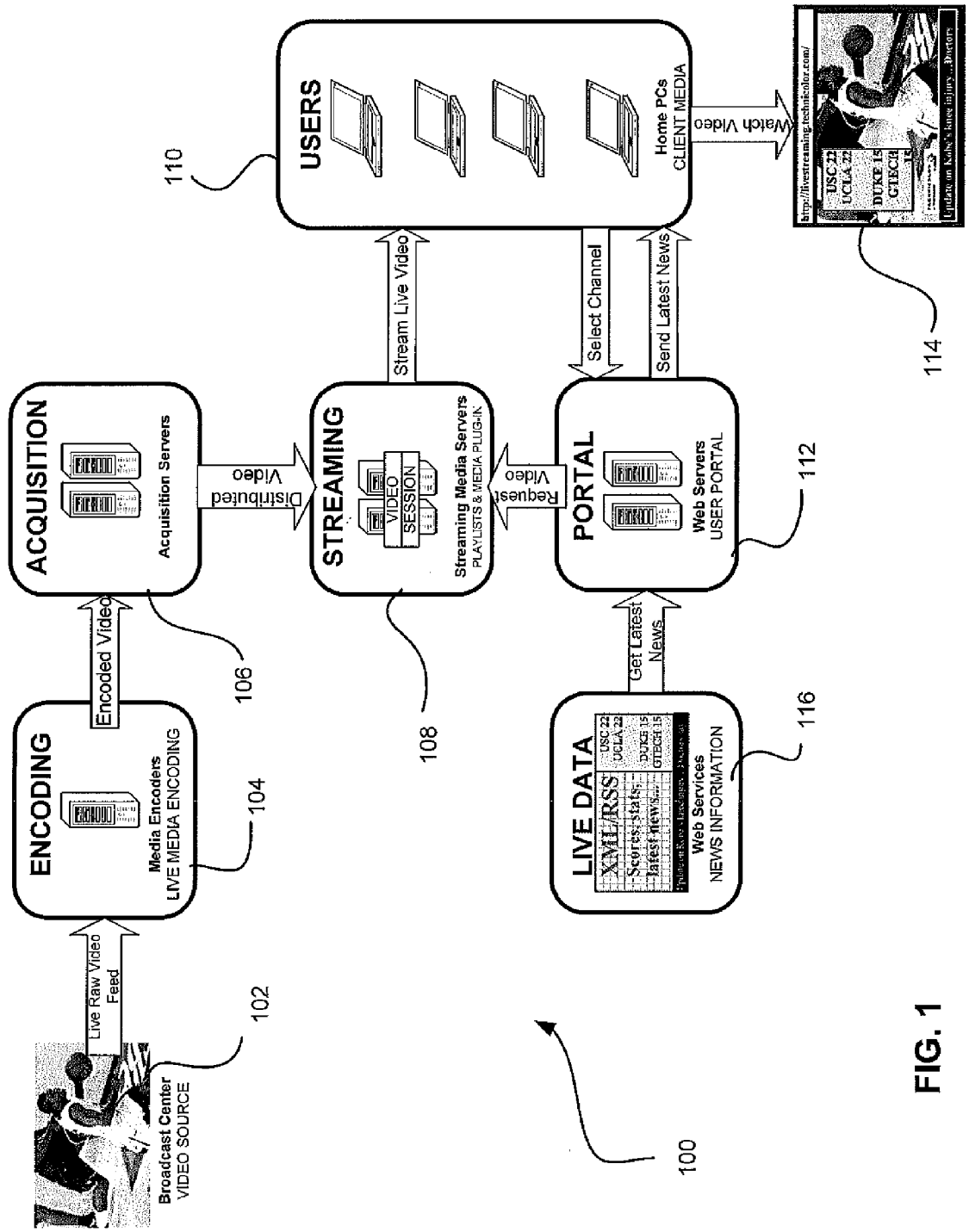
FIG. 1 illustrates a conventional system for streaming media.

It should be understood that the drawing(s) is for purposes of illustrating the concepts of the disclosure and is not necessarily the only possible configuration for illustrating the disclosure.

DETAILED DESCRIPTION OF PREFERRED EMBODIMENTS

It should be understood that the elements shown in the FIGS. may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

A system and method for session management of streaming media, e.g., audio or video, are provided. The system and method of the present disclosure authenticate and validate any request for live or streaming video and manage the streaming session in a manner that continues to verify the validity of existing video streams with respect to new requests. By managing the current streaming sessions in tandem with new requests, the system and method are able to determine which new requests to authenticate as well as preempt the disconnection of existing streams that are no longer valid or whose authentication has expired. In addition, the system and method provide many levels of security beyond DRM for validating the request, and each of these can be controlled in a highly configurable and dynamic manner. Each request will be accompanied by an encrypted token including parameters associated with the requesting user or client.

Figure 2:
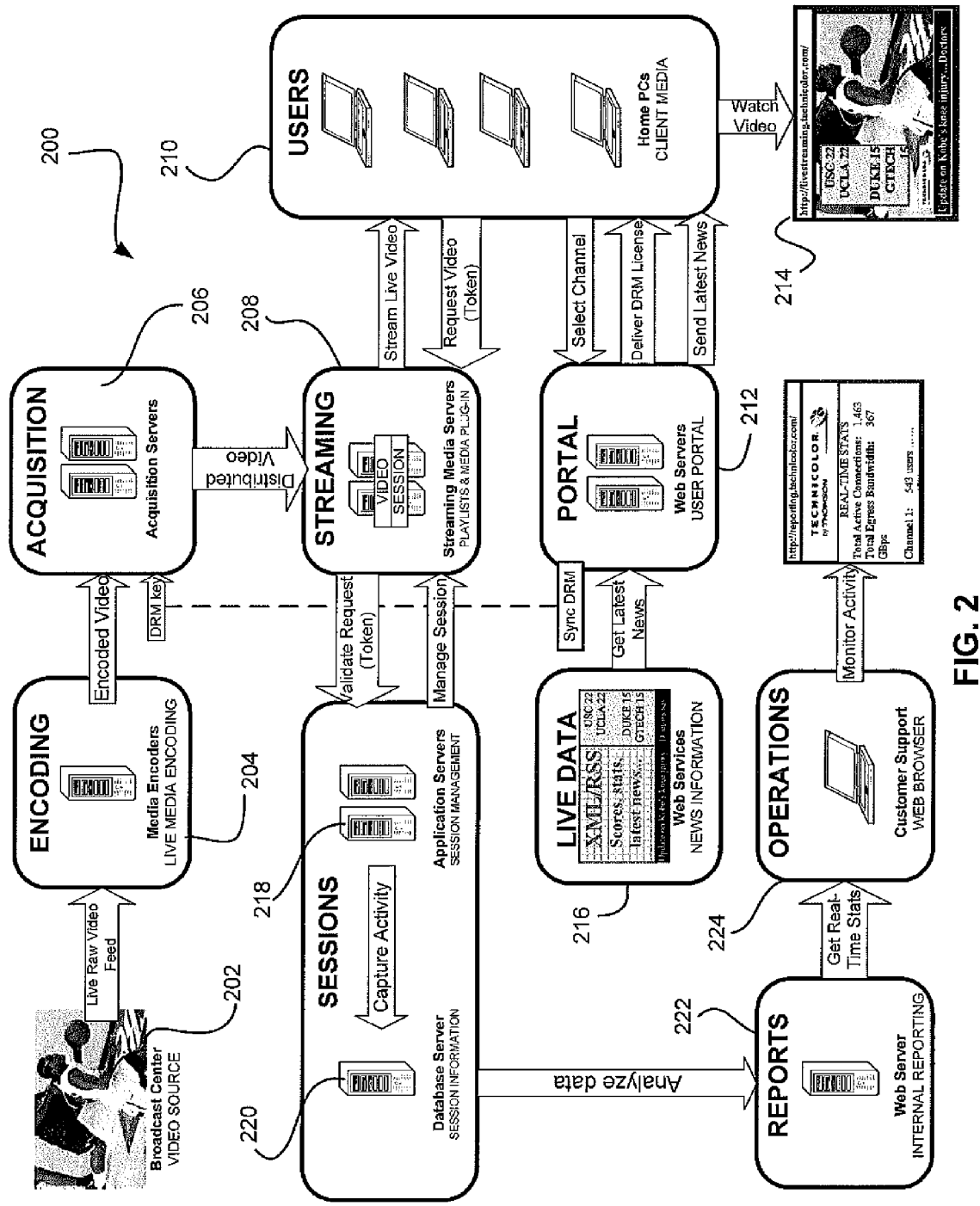
FIG. 2 illustrates an exemplary overall system and method for session management of streaming media in accordance with the present disclosure.
Figure 3:
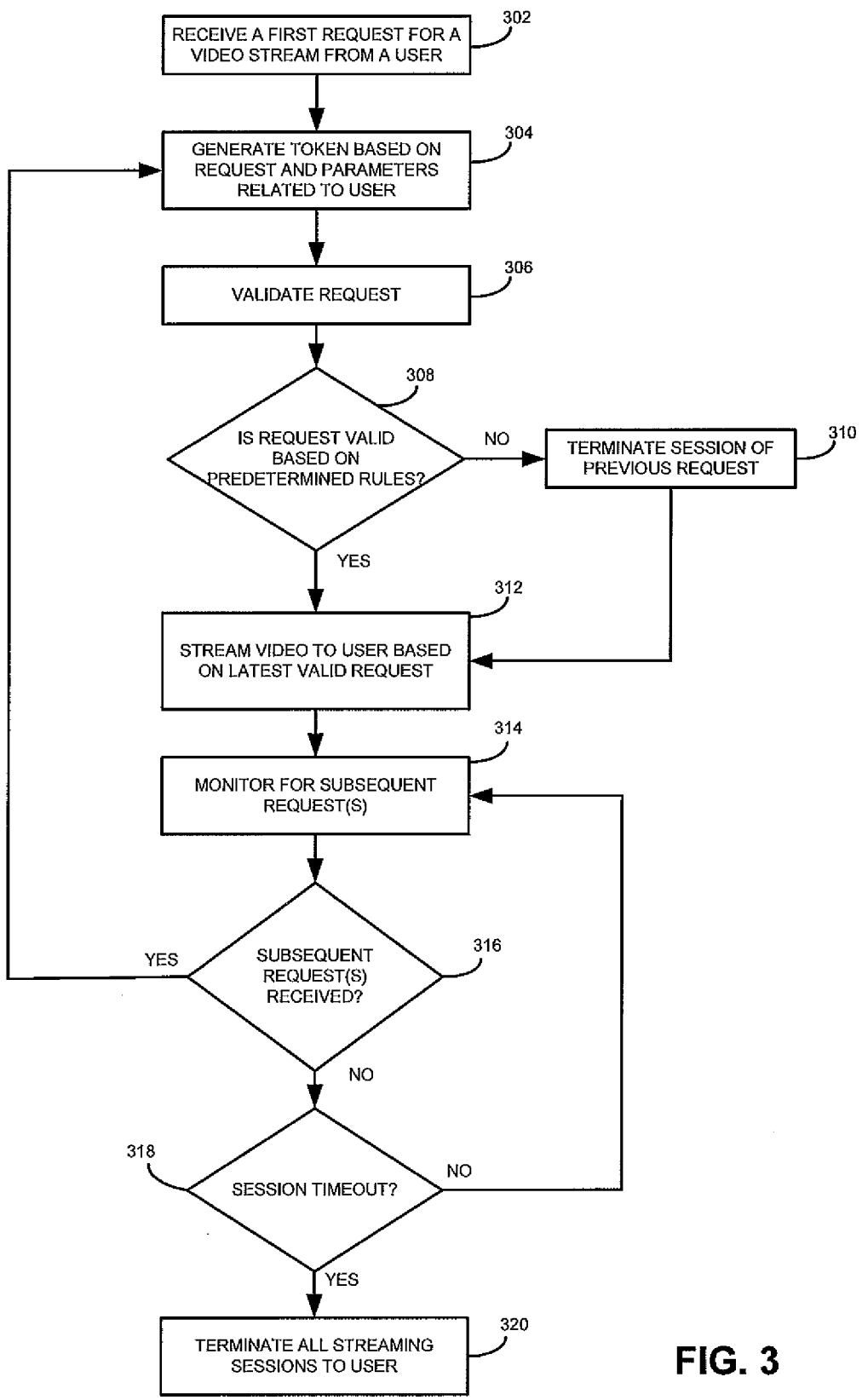
FIG. 3 is a flow diagram of an exemplary method for session management of streaming media in accordance with the present disclosure.

Referring to FIGS. 2 and 3, an overall system and method for session management of streaming media in accordance with the present disclosure are illustrated. Generally, session management begins with a request for a video stream from a user (step 302). The user 210 will access a web portal 212 and select a channel for a live stream feed, i.e., a request for a video stream. The web portal 212 will generate a token based on the request by the user and parameters related to the user (step 304), e.g., account or subscription parameters. The token may include the following parameters: external transaction ID, date time, IP address, User ID, channel number and video quality level. The token is encrypted and sent to streaming media server 208. In one embodiment, the encryption is RSA with a public/private key pair, however, other forms and method of encryption may be employed.

Next in step 306, the request is validated. The request is decrypted by the sessions servers 218 and validated. The sessions server 218 authenticates and validates any request for live or streaming video and manages the streaming session in a manner that continues to verify the validity of existing video streams with respect to new requests. Validation includes verifying the contents of the request and the predetermined rules that surround the request itself (such as a valid channel, and timestamp of the request), as well as checking its content parameters against existing streams for that user. It is to be appreciated that the predetermined rules may be different for each user according to their account or subscription. For example, a user may purchase a plan where the user is allowed a predetermined number of concurrent video streams and/or may purchase a package including predefined channels. In step 308, if it is determined the request is valid, the video is streamed to the user 210 (step 312). The request and validation results are stored in the session management database 220.

All future activity related to that stream, as determined by the streaming servers 208, is monitored by the sessions servers 218 and recorded in the session management database 220 (step 314). The session server 218 will determine if any subsequent requests are received from the end user 210 (step 316). If no subsequent requests are received at step 316, it is determined if the current session timeout has been reached (step 318). If the session timeout has been reached, all streaming video sessions to the user will be terminated (Step 320); otherwise, the sessions servers 218 will continue to monitor for subsequent requests.

The sessions servers 218 will monitor the user's activity and store the activity in the database server 220. The data will then be sent to the reports web server 222 for analysis. Real-time and historical statistics for session management are provided through ad-hoc reports for monitoring by operations 224, for monitoring the overall health of the system (i.e. that sessions are being managed correctly and to view any issues that may arise as a result of issues with network congestion, client side issues, etc.)

In step 316, if it is determined that a subsequent request has been received from the user 210, the method will revert to step 304 and generate a new token for the new request. However, if it is determined in step 308 that the request is not valid, the sessions server will terminate the session of the previous request or deny the new subsequent request (step 310). New requests may be denied resulting in a dynamically generated playlist that may involve an error video describing the issue. For example, if someone is already streaming then the system may not allow the new request to proceed. Existing requests may be disconnected by the system to permit a new request. For example, if a user tries to start a new stream elsewhere (say at a local coffee house on their laptop) but they forgot to disconnect their stream at home.

It is to be appreciated that the system (server) may forcibly terminate a stream to the client's PC 210 under various conditions, i.e., at least one predetermined rule associated with the user's account. For example, the system may terminate a video stream if an end-user is attempting to stream more channels than the amount permitted for their userid/account (the maximum number is configurable on the server end), or if the end-user attempts to share the link to video stream with friends. Furthermore, operations or broadcasters may end user sessions if the programming content permitted has finished and no more content is available for streaming or allowed (e.g. at the end of a sports event).

Figure 4:
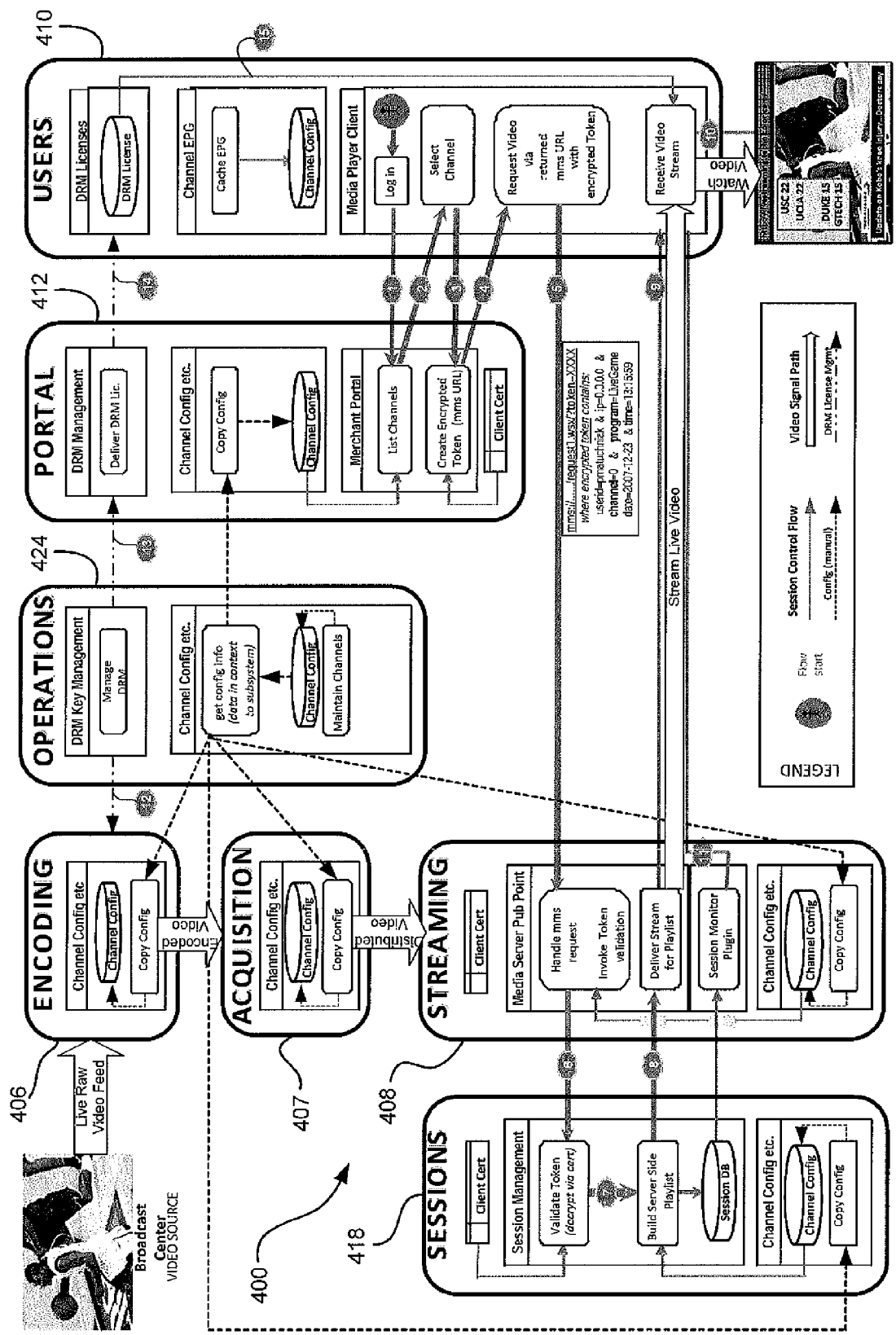
FIG. 4 illustrates a flow diagram between system components for managing at least one session of streaming media in accordance with the present disclosure.

Referring to FIG. 4, a flow diagram between system components for managing at least one session of streaming media in accordance with the present disclosure is provided. It is to be appreciated that the system components shown in FIG. 4 may be included in a single server or may be distributed among several servers. The server may be implemented on any of the various known computer platforms having hardware such as one or more central processing units (CPU), memory such as random access memory (RAM) and/or read only memory (ROM) and input/output (I/O) user interface(s) such as a keyboard, cursor control device (e.g., a mouse or joystick) and display device. A system bus couples the various components and may be any of several types of bus structures including a memory bus or memory controller, a peripheral bus, and a local bus using any of a variety of bus architectures. The computer platform also includes an operating system and micro instruction code. The various processes and functions described herein may either be part of the micro instruction code or part of the software application program (or a combination thereof) which is executed via the operating system. In one embodiment, the software application program is tangibly embodied on a program storage device, which may be uploaded to and executed by any suitable machine such as server 218 of FIG. 2.

In addition, various other peripheral devices may be connected to the computer platform of the server or machine by various interfaces and bus structures, such a parallel port, serial port or universal serial bus (USB). One such peripheral device may include a communication module, element or the like, e.g., a modem, satellite relay, wireless connection, etc., for enabling communications from the server to various content servers and various user PCs. Other peripheral devices may include additional storage devices, a printer and a scanner.

The server may operate in a networked environment using logical connections to one or more remote computers, e.g., user PCs, content server, etc. The remote computer may be a personal computer, a server, a router, a network PC, a peer device or other common network node, and typically includes many or all of the elements described above relative to the machine. It is to be appreciated that the network may be a local area network (LAN), wide area network (WAN), the Internet or any known network that couples a plurality of computers to enable various modes of communication via network messages. The server may communicate to the server and network via any known communication link, for example, dial-up, hardwired, cable, DSL, satellite, cellular, PCS, wireless transmission (e.g., 802.11a/b/g, etc.), etc. Furthermore, the devices will communicate using the various known protocols such as Transmission Control Protocol/Internet Protocol (TCP/IP), File Transfer Protocol (FTP), Hypertext Transfer Protocol (HTTP), etc. During a purchasing transaction, the computing devices may employ Hypertext Transfer Protocol Secure (HTTPs), Secure Sockets Layer (SSL) Protocol, Secure Electronic Transaction (SEC) Protocol, etc. Additionally, the server may employ any know protocol which supports streaming media such as Real-time Transfer Protocol (RTP); Real-time Streaming Protocol (RTSP) and Real-time Transport Control Protocol (RTCP) among others.

Among other components, the system 400 will include an encoding module, element or the like 406 for encoding live raw video feed and an acquisition module, element or the like 407 for distributing the encoded video. An operations module, element or the like 424 is provided for DRM key management and for managing the channel configuration of available channels. The system 400 further includes a portal module, element or the like 412 for receiving various requests from users 410 and for generating a token based on the requests and at least one parameter associated with the client or user 410. A sessions module, element or the like 418 validates the token based on at least one predetermined rule associated with the client and a streaming module, element or the like 408 provides the video stream to the client.

The interaction of system components along with the session control flow and video signal flow will now be described with reference to FIG. 4.

Initially, a user via end-user PC 410 will log in to portal module 412, e.g., a merchant portal, to request a channel guide or list of available channels (step 1). The merchant portal generates the list of channels from the channel configuration obtained from the operations module 424. The channel configuration contains the available channels for viewing with the following configurable information: channel number; channel description (or program description); video source; video playlist sequencing and timing; maximum number if concurrent sessions allowed (e.g., per user, IP address, etc.); and enforcement rules for token parameters (e.g., for restriction/validation by IP address, for validation of window of time that the request was made, etc). The channel configuration is then provided to the encoding module 406, acquisition module 407, streaming module 408 and sessions module 418.

In step 2, the media player client running on the end-user PC 410 will receive the channel guide and present the channel guide to the user. The user will select a channel and a channel request is then forwarded back to the merchant portal (step 3). The merchant portal then creates or generates an encrypted token step 4) which is returned to the media player client with a URL link for the channel request.

In step 5, the user 410 requests the video by invoking the URL link with the encrypted token. The encrypted token is received at the streaming module 408 as a query string variable in the URL, e.g.:

$$\text{mms://stream-transaction.synccast.com/livestreaming/request1\_live\_directv.wsx?token=KvU} \quad (1)$$

where "mms" is the media server; "stream-transaction.synccast.com" is the domain name; "request1_live_directv.wsx" is the WSX file—Wrapper Playlist Object; and "token=" are the various parameters in the request encrypted via a certificate into a token. The various parameters in the request (e.g., external transaction ID, date time, IP address, User ID, channel number and video quality level) are combined into a single string and then encrypted. The method of encryption is accomplished via an RSA certificate that is provided by the operations module 424 to the portal module 412, e.g., a merchant portal.

Figure 5:
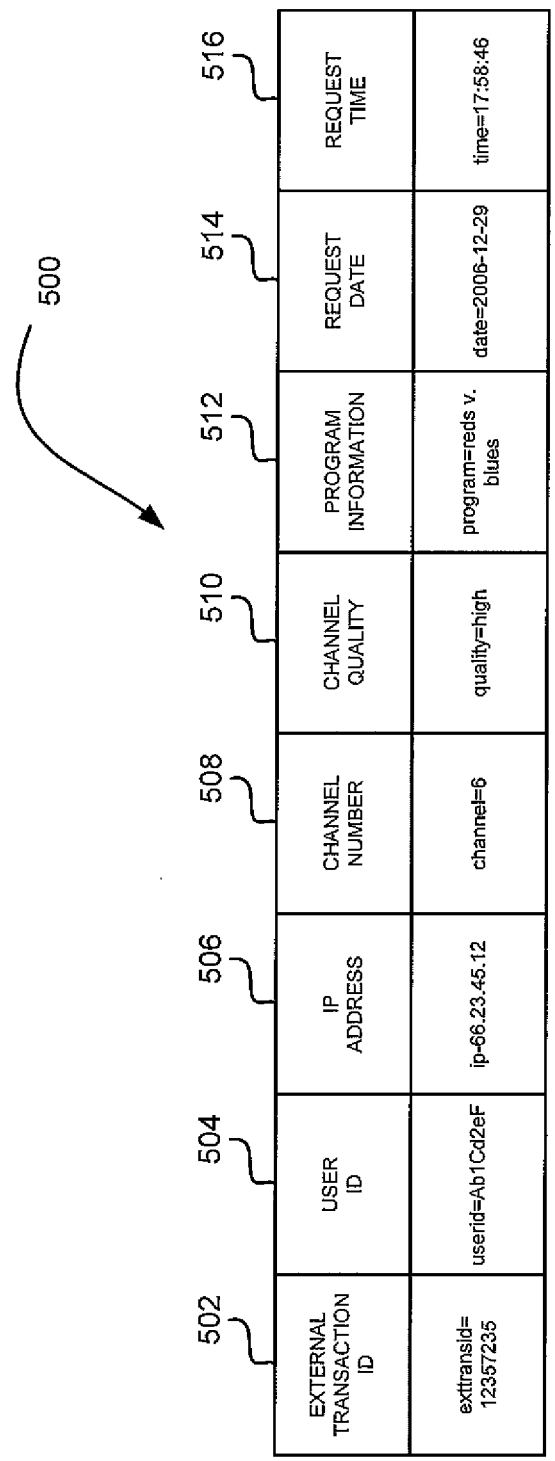
FIG. 5 illustrates a data structure of a token employed in the session management of the streaming media in accordance with the present disclosure.

In step 6, the encrypted token is then passed to the sessions module 418 which validates the encrypted token. When decrypted, the token 500 reveals the following parameters, as shown in FIG. 5:

External Transaction Id (502)
Format: numeric. Generated by Service Provider and unique across all transactions, e.g.,
exttransid=123578235
UserId (504)
Format: alpha-numeric. Generated by service provider and uniquely identifies a user, e.g.,
userid=Ab1Cd2eF
IP Address (506)
Format: 127.127.127.127. This represents the user's IP address, e.g.,
ip=66.23.45.12
Channel Number (508)
Format: numeric. The requested channel to be streamed, e.g.,
channel=6
Channel Quality (510)
Format: alpha-numeric. The quality level required (initially "low", "medium", "high"), e.g.,
quality=high
Program Information (512)
Format: alpha-numeric (limit description to 15 chars). Optional field for descriptions only, e.g.,
program=reds v. blues
Request Date (514)
Format: CCYY-MM-DD. GMT date that the request was made as determined by service provider, e.g.,
date=2006-12-29
Request Time (516)
Format: HH:MI:SS, where HH is 24 hour. GMT time that the request was made as determined by service provider, e.g.,
time=17:58:46

In response to validating the token in step 7, the sessions module 418 builds a "Dynamic" Server Side Playlist response, i.e., either the requested stream or an error video. A server-side playlist provides a way of controlling the media to be streamed. On the client-side, a playlist is easily modifiable by the end-user and as such provides a poor means for enforcing control. A server-side playlist cannot be modified by the user and as such is useful for guaranteeing ad insertion and the length and sequence of various media playback. Importantly, a server-side playlist hides the true source of the video stream, and in the manner employed in the system and method of the present disclosure, a server-side playlist can point to the same video stream but where the link to that stream appears unique to the end-user, thus making it harder to share with others without being recognized as being shared.

The sessions module 418 then records the request and result in the session database. Alternatively, the sessions module 418 sends a force disconnect for other streams if user in violation of session rules. The sessions module 418 forwards the server side playlist to the streaming module 408 which instructs the streaming module 408 to deliver the video content to be streamed (step 8). In step 9, the streaming module 408 streams live video, e.g., encoded video, to end-user's PC 410. The user's activity is captured by the session monitor of the streaming module 408 (step 10). In step 11, based on the session management rules, a subsequent request by the user will be allowed or the sessions module 418 will force stream disconnect from user.

It is to be appreciated that the system of the present disclosure can control the number of concurrent streams per user, such that the system may allow one user ID the ability to stream X number of videos. Accordingly, the sessions module 418 determines a number of video streams provided to the user or client, determines if a request exceeds a predetermined number of video streams for the client and terminates at least one video stream if the predetermined number of video streams is exceeded. Furthermore, by ensuring that the request is fulfilled to the IP address that is in the encrypted token means that the stream link cannot be shared with other, non-validated users. In this scenario, the sessions module 418 determines if the user or client is receiving a requested first video stream at a second IP address, terminates the first video stream to the second IP address and provides the first video stream to the first IP address. Additionally, the sessions module 418 can also validate that the "external transaction id" is unique and therefore has not been used before. If that is not the case, then the request is being sent multiple times, possibly indicating that the link of the URL and token has been shared with other users or attempted to be used on other PCs, etc.

In addition to managing concurrent or multiple streams to a user, the system and method will enforce other predetermined rules for streaming a single video. For example, by incorporating a time frame in the encrypted token means that the link cannot be saved for later use if that time happens to fall outside the configured window or time frame based on the current time. The sessions module 418 will determine a time and date of the request in the token, determines if the requested time and date is outside an allowable time frame, and terminates the first video stream if the requested time and date is outside the allowable time window.

It is to be appreciated that the system and method of the present disclosure further employ DRM keys to control the streaming media. Referring back to FIG. 4, the operations module 424 generates a DRM key and forwards this key to the encoding module 406 for encrypting the video stream (step 12). The operation module 424 also provides the DRM key to the portal module 412 (step 13) which then forwards the key to the appropriate end user 410 (step 14). The DRM key is then employed on the end user's PC to decrypt the video stream (step 15).

Although embodiments which incorporates the teachings of the present disclosure have been shown and described in detail herein, those skilled in the art can readily devise many other varied embodiments that still incorporate these teachings. Having described preferred embodiments of a system and method for session management of streaming media (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

What is claimed is:

1. A method for providing a video stream, the method comprising the steps of:
   receiving a first request for a first video stream from a user at a client device having a first IP address;
   providing the first video stream to the client device having the first IP address based on the first request and a first token, the first token including at least one parameter associated with the user, the at least one parameter including an IP address;
   receiving a subsequent second request from the user for a second video stream at a client device having a second IP address;
   determining if the second request exceeds a number of concurrent video streams to be provided for the user based on the second request and a second token, the second token including at least one parameter associated with the user; and
   terminating the first video stream provided to the client device having the first IP address and providing the second video stream to the client device having the second IP address if it is determined that the second request exceeds the number.

2. The method as in claim 1, wherein the at least one parameter of the first token further includes at least one of an external transaction ID, a user ID, a channel number, video quality level, program information, request date and request time.

3. The method as in claim 1, wherein the at least one parameter of the second token further includes at least one of an external transaction ID, a user ID, an IP address, a channel number, video quality level, program information, request date and request time.

4. The method as in claim 1, wherein terminating the first video stream includes providing a video stream to client device having the first IP address indicating the issue.

5. The method as in claim 1, further comprising providing the first token to the client device at the first IP address in a URL link.

6. The method as in claim 5, further comprising invoking the URL link in order to validate the token.

7. The method as in claim 1, wherein providing the first video stream further includes generating a playlist to control the first video stream to be sent to the client device.

8. The method as in claim 7, wherein the playlist provides the requested first video stream.

9. The method as in claim 7, wherein the playlist provides an error video terminating the requested first video stream.

10. The method as in claim 1, wherein determining if the second request exceeds a number of concurrent video streams further includes:
    determining a time and date of the second request in the token;
    determining if the requested time and date is outside an allowable time frame; and
    terminating at least one video stream if the requested time and date is outside the allowable time frame.

11. An apparatus comprising:
    a portal element that receives a first request for a first video stream from a user at a client device having a first IP address, the portal element also adapted to receive a subsequent second request from the user for a second video stream at a client device having a second IP address;
    a sessions element, coupled to the portal element; and
    a streaming element, coupled to the sessions element, the streaming element providing the first video stream to the client device having the first IP address based on the first request and a first token, the first token including at least one parameter associated with the user, the at least one parameter including an IP address;
    wherein, upon receiving the subsequent second request, the sessions element determines if the second request exceeds a number of concurrent video streams to be provided for the user based on the second request and a second token, the second token including at least one parameter associated with the user and wherein the streaming element terminates the first video stream provided to the client device having the first IP address and provides the second video stream to the client device having the second IP address if the sessions element determines that the second request exceeds the number.

12. The apparatus as in claim 11, wherein the at least one parameter of the first token further includes at least one of an external transaction ID a user ID, a channel number, video quality level, program information, request date and request time.

13. The apparatus as in claim 11, wherein the at least one parameter of the second token further includes at least one of an external transaction ID a user ID, a channel number, an IP address, video quality level, program information, request date and request time.

14. The apparatus as in claim 11, wherein the streaming element further provides a video stream to client device having the first IP address indicating the issue if the sessions element determines that the second request exceeds the number.

15. The apparatus as in claim 11, wherein the first token is provided to the client device at the first IP address in a URL link.

16. The apparatus as in claim 15, wherein the URL link is invoked by the client device at the first IP address in order to validate the token.

17. The apparatus as in claim 11, wherein the sessions element further builds a playlist for the requested first video stream and wherein the streaming element provides the playlist to the client device at the first IP address.

18. The apparatus as in claim 17, wherein the playlist includes the requested first video stream.

19. The apparatus as in claim 17, wherein the playlist includes an error video terminating the requested first video stream.

20. The apparatus as in claim 11, wherein the sessions element further determines a time and date of the second request and determines if the requested time and date is outside an allowable time frame, and wherein the streaming element terminates the first video stream if the requested time and date is outside the allowable time window.

* * * * *